United States Patent [19]

Daugherty

[11] Patent Number: 4,476,775
[45] Date of Patent: Oct. 16, 1984

[54] COFFEE MAKING MACHINE

[75] Inventor: Donald L. Daugherty, Sherman, Ill.

[73] Assignee: Bunn-O-Matic Corporation, Springfield, Ill.

[21] Appl. No.: 509,913

[22] Filed: Jul. 1, 1983

Related U.S. Application Data

[63] Continuation-in-part of Ser. No. 334,579, Dec. 28, 1981, Pat. No. 4,413,552.

[51] Int. Cl.³ .............................................. A47J 31/00
[52] U.S. Cl. ......................................... 99/295; 99/304
[58] Field of Search ................. 99/279, 280, 281, 282, 99/283, 295, 300, 304, 290, 306, 307; 426/433

[56] References Cited

U.S. PATENT DOCUMENTS

| | | | |
|---|---|---|---|
| 3,385,201 | 5/1968 | Martin | 99/295 |
| 3,443,508 | 5/1969 | Reynolds | 99/282 |
| 3,450,024 | 6/1969 | Martin | 99/295 |
| 3,740,231 | 6/1973 | Drwal | 99/281 |
| 4,222,320 | 9/1980 | Castleberry | 99/295 |
| 4,354,427 | 10/1982 | Filipowicz | 99/295 |

*Primary Examiner*—Robert W. Jenkins
*Attorney, Agent, or Firm*—Lockwood, Dewey, Alex & Cummings

[57] ABSTRACT

A cold water pour-in beverage brewer having a generally C-shaped body with upper and lower leg portions extending forwardly from an upright interconnecting leg portion. The body houses an inverted L-shaped receptacle formed by an elongated shallow cold water basin from adjacent one end of which a relatively deep hot water tank depends. The basin sets in the top of the upper leg portion and has an out-turned flange on its top edge which rests on an in-turned flange on the top opening in the body. A cover fits the basin and rests thereon in raised relationship to provide a vent path therebetween. The cover has a pour-in opening adjacent the front of the brewer. The hot water tank is housed mainly within the upright leg portion. A removable funnel is supported underneath upper leg portion. Beverage from the funnel falls into a beaker on a heater on the lower leg portion. A removable baffle closes the opening between the cold water basin and the hot water tank to provide access to the interior of the hot water tank for cleaning. The baffle has a drain opening aligned with a cold water tube extending downwardly into the hot water tank from the baffle the drain opening is substantially smaller than the interior of the cold water tube. A vent tube carried by the baffle provides venting between the head space in the hot water tank and the upper portion of the basin.

6 Claims, 10 Drawing Figures

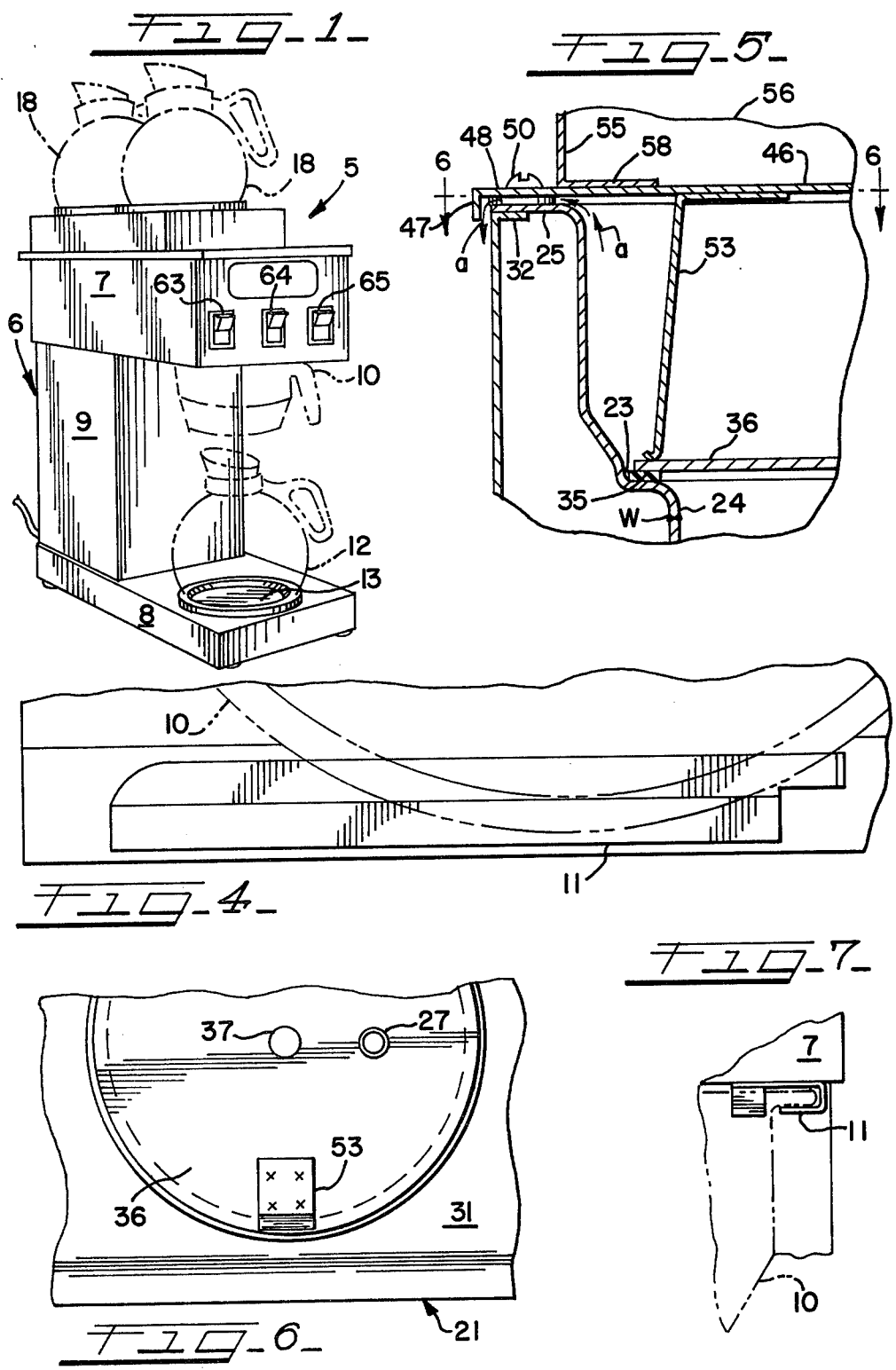

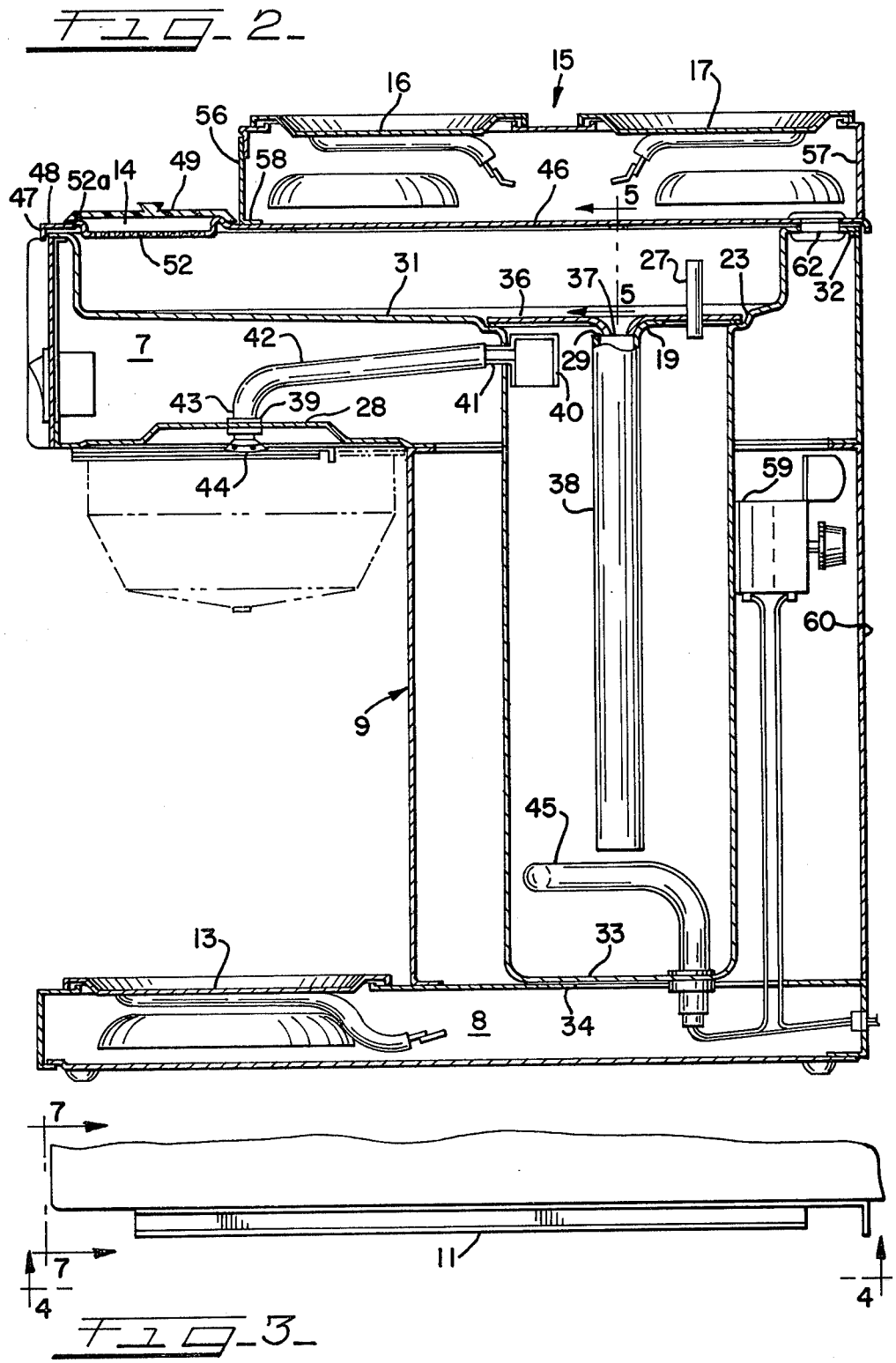

COFFEE MAKING MACHINE

This application is a continuation-in-part of my co-pending application, Ser. No. 334,579 filed Dec. 28, 1981, now U.S. Pat. No. 4,413,552.

This invention relates generally to innovations and improvements in beverage brewers of the cold water, pour-in type which have a generally C-shaped body providing upper and lower horizontal leg portions interconnected from the underside and topside, respectively, by an upright leg portion, and which have a shallow elongated cold water basin housed within said upper leg portion and deep hot water tank depending from the cold water basin and housed mainly within the upright leg portion, the cold water basin and hot water tank together forming an inverted L-shaped receptacle. These novel beverage brewers are relatively narrow and have the pour-in opening in the top adjacent the front end with two top warmers behind the pour-in opening in addition to the usual bottom warmer which supports a beaker or carafe under the brewer funnel. The brewer is capable of brewing a two-quart batch of coffee or other beverage and two quarts of cold water can be rapidly dumped into the pour-in opening.

Cold water pour-in beverage makers of known type in which a supply of hot water is maintained until displaced by cold water, are in extensive use, primarily in homes and small offices. For example, cold water, pour-in beverage makers are disclosed in the following U.S. Pat. Nos.: Martin U.S. Pat. No. 3,220,334, Lorang U.S. Pat. No. 3,354,810, Martin U.S. Pat. No. 3,450,024, Reynolds U.S. Pat. No. 3,479,949, Martin U.S. Pat. No. 3,494,276, Bloomfield et al. U.S. Pat. No. 3,513,767, Martin U.S. Pat. No. 3,691,932, Martin U.S. Pat. No. 3,736,155 and Petry U.S. Pat. No. 4,192,227. In restaurants and larger offices, the beverage brewers are generally of the automatic type in which batches of cold water are introduced from a cold water supply line discharging into a cold water basin under the control of an electrically operated valve. Beverage brewers of the automatic type are disclosed in the following U.S. Pat. Nos.: Bunn U.S. Pat. No. 3,100,434, Martin U.S. Pat. No. 3,691,933, Martin U.S. Pat. No. 3,793,934, Martin U.S. Pat. No. 4,094,233 and Bunn U.S. Pat. No. Re. 25,663. Also known are beverage brewers which normally are operated automatically, but which can also be operated as cold water pour-in beverage brewers. Such dual-type beverage makers are disclosed in U.S. patent application Ser. No. 462,139 filed Jan. 31, 1983 in the name of John D. Zimmerman and assigned to the assignee of the present invention.

The cold water, pour-in type of beverage brewer offers several important advantages over the automatic type. Two of the most important being that they are portable and do not require a plumbing connection. On the other hand, the pour-in type beverage brewers tend to have less capacity than the automatics and, in at least some models, a full batch of cold water cannot be rapidly dumped into the pour-in opening.

The object of the present invention, generally stated, is provision of an improved beverage brewer characterized by having a generally C-shaped body housing an inverted L-shaped receptacle provided by an elongated shallow cold water basin integrally joined to a deep hot water tank and having, if desired, a capacity to maintain at least two quarts of water in heated condition in the hot water tank ready for use in brewing with provision for two quarts of cold water to be rapidly introduced into the cold water basin, such a brewer being improved in respect to reduced evaporation from the hot water tank and ample venting of the cold water basin.

A further object of the invention is the provision of an improved beverage maker of the foregoing type and character which is relatively narrow from side to side so as to take up a small amount of counter space from left to right and has a readily accessible cold water pour-in opening adjacent the front end, and one or more beaker warmers mounted on a top heater unit rearwardly of the pour-in opening.

The increased capacity (e.g. up to two quarts of cold water), rapid fill and rapid beverage production features permit the improved beverage brewers of my invention to be utilized in a number of places where currently available cold water, pour-in type beverage or coffee brewers are not considered to have adequate capacity.

A further object of the invention is the provision of an improved beverage brewer of the foregoing type and character wherein the bottom of the elongated, shallow cold water basin has an opening thereon that mates with the top opening of the deep hot water tank and such opening is closed by a plate which has a drain opening therein which is substantially smaller than the interior of the cold water tube aligned therewith and which plate also carries a vent tube with a small bore which communicates between the head space in the hot water tank and the upper portion of the cold water basin.

Still another important object of the invention is the provision of a beverage brewer of the foregoing type and character wherein the shallow elongated cold water basin is removably supported from the upper edge of a top opening in the brewer body, and a removable cover on the body covers the top of the basin as well as the top opening in the brewer body with an elongated vent opening between the cover and the cold water basin.

Certain other objects of the invention will be apparent from the following detailed description of a presently preferred embodiment of the invention taken in connection with the accompanying drawings wherein:

FIG. 1 is a perspective view of a cold water, pour-in coffee brewer forming one embodiment of the present invention and wherein three coffee beakers or carafes are shown in broken outline along with a removable brewer funnel.

FIG. 2 is a longitudinal vertical sectional view of the brewer shown in FIG. 1, certain parts being shown in elevation.

FIG. 3 is a fragmentary side elevational detail view on enlarged scale showing the inside of one of the guide rails for the removable brewer funnel.

FIG. 4 is a fragmentary detail bottom plan view of the guide rail construction shown in FIG. 3.

FIG. 5 is an enlarged fragmentary detail sectional view taken on line 5—5 of FIG. 2.

FIG. 6 is a fragmentary top plan view taken on line 6—6 of FIG. 5.

FIG. 7 is a fragmentary detail view taken on line 7—7 of FIG. 3.

Figure 8:
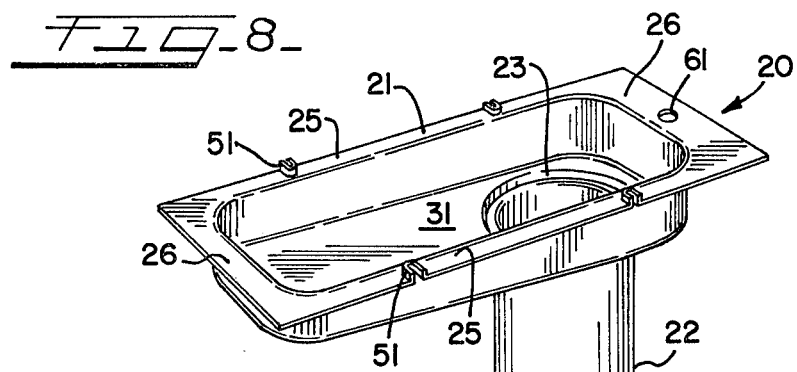
FIG. 8 is a perspective view of the integral, inverted L-shaped, combination elongated shallow cold water basin and relatively deep hot water tank housed in the brewer shown in FIGS. 1 and 2.

Referring to FIG. 1, a cold water, pour-in coffee brewer is indicated generally at 5 which has a generally C-shaped body 6 which includes an upper leg portion 7, a lower leg portion 8, and an interconnecting upright leg portion 9. The brewer body 6 is fabricated in known manner, desirably from stainless steel sheet, but it may be fabricated from other metals, from known plastics having suitable strength and durability, or from combinations of materials. A brewer funnel of known type indicated at 10 is removably supported in known manner by a pair of horizontal guide rails 11—11 (FIGS. 4 and 7) underneath the upper let portion 7. A coffee beaker or carafe 12 is removably supported on the leg 8 underneath the funnel 10 on a heated warming plate or disc 13 mounted on the lower leg portion 8.

A cold water, pour-in opening 14 is located on the top front (FIG. 2) of the upper leg portion 7. Rearwardly thereof, a top warmer unit 15 is mounted which includes a pair of warming plates 16 and 17 on which two additional beakers or carafes 18 (FIG. 1) may be mounted.

Figure 9:
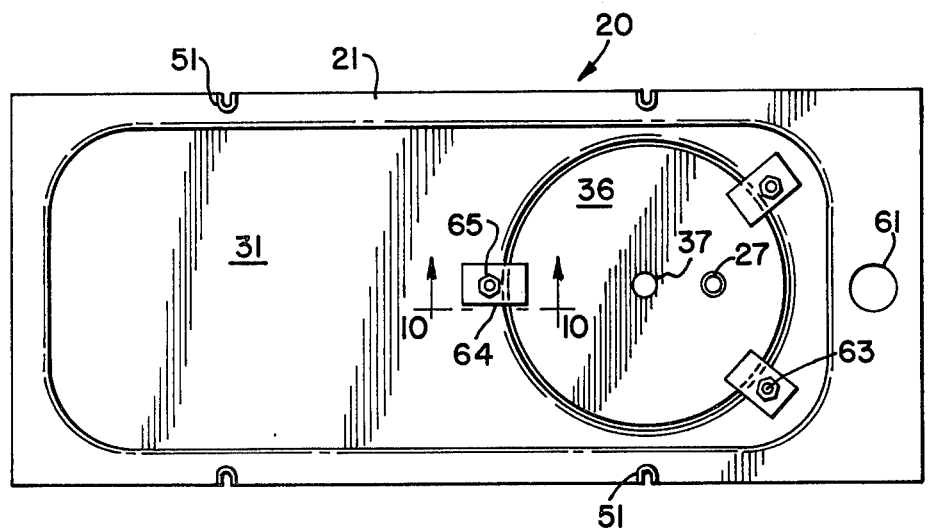
FIG. 9 is a top plan view of the integral cold water basin-hot water tank shown in FIG. 8 with the addition of a lid disc in place over the hot water tank and held down by three clamps.

The C-shaped brewer body 6 houses a receptacle in the form of an integral, inverted L-shaped, combination elongated cold water basin and relatively deep hot water tank indicated generally at 20 in FIGS. 8 and 9. The elongated cold water basin 21 is desirably die-pressed in known manner from stainless steel sheet and the relatively deep hot water tank 22 is welded to a bottom opening formed adjacent the deep end of the basin 21. The opening in the bottom of the basin 21 is formed in such a manner as to have a circumferential depression or recess 23 (FIGS. 2 and 8) with a circumferential collar or lip 24 (FIG. 5) integrally formed on the bottom of the depression 23. The upper circumferential edge of the deep tank 22 is welded (W FIG. 5) to the bottom edge of the collar 24 so as to make the basin and tank 22 the integral inverted L-shaped receptacle or container 20. The tank 22 is preferably fabricated from stainless steel sheet in known manner.

The upper edge of the shallow cold water pan or basin 21 is provided with a continuous out-turned, horizontal flange comprising side portions 25—25 and end portions 26—26.

It will be seen from FIG. 2 that the bottom 31 of the basin 21 slopes toward the bottom recess 23 so that cold water poured into the basin 21 will flow and drain into the tank 22.

The manner in which the unit 20 is mounted and supported within the housing or body 6 of the brewer is shown in FIGS. 2 and 5. Referring to FIGS. 2 and 5, it will be noted that the upper leg portion 7 of the body 6 has an inturned horizontal flange 32 formed around the upper edge thereof. The out-turned flange 25-26 on the upper edge of the basin 21 is dimensioned so as to fit over and rest flatwise upon the in-turned flange 32.

The height of the deep tank 22 is so dimensioned that the bottom 33 thereof is spaced at least slightly above the top wall 34 of the lower leg portion 8 so that the lateral flange 25-26 on the basin 21 will rest on the in-turned flange 32.

In a brewer 5 capable of making two-quart batches of coffee, the tank 22 can have, by way of illustrative example, an inside diameter of 5 inches and a depth of 14 inches giving it a capacity of 275 cubic inches (i.e. 4.76 fluid quarts). The capacity of the shallow basin 21 suitable for a hot water tank 22 of such capacity is 155 cubic inches (i.e. 2.68 quarts) with the interior of the basin having a length of 15¼ inches, a width of 6¼ inches and a depth ranging from 1¾ to 1½ inches.

The circular opening at the bottom of the collar 24 on the bottom 31 of the basin 21 mates with the opening at the top of the tank 22 and is closed by a disc or baffle 36 which rests on a ring gasket 35 (FIG. 5) seated in the recess 23. A central drain opening 37 is provided in the disc 36 which is aligned with the upper end of a vertical cold water tube 38 (FIG. 2), the upper end of which is attached as indicated at 19 to the underside of the disc 35 with the provision of at least one vent opening 29. The bottom end of the cold water tube 38 terminates adjacent the bottom 33 of the tank 22 so that as cold water flows downwardly through the tube 38, it is discharged in the lower portion of the tank 22 and thereby displaces upwardly the hot water contents in the tank 22. This manner of operation is well-known in connection with brewers of the cold water, pour-in type.

It will be noted, particularly from FIG. 2, that the drain opening 37 is substantially smaller in size than the interior of the cold water tube 38. By virtue of the small area of the opening 37, the problem of hot water evaporation from the tank 22 is eliminated to an acceptable degree.

In order to provide for venting the headspace in the hot water tank 22 when cool or cold water is flowing from the basin 21 through the drain opening 37 into the cold water tube 38, a vent tube 27 is mounted on the disc 36. The small bore through the vent tube communicates between the headspace in the hot water tank 22 and the upper portion of the cold water basin 21 so that venting of the headspace is permitted even when the basin nearly filled with water.

An inverted siphon cup 40 is positioned adjacent the top of the tank 22 and the side thereof facing the removable brewer funnel 10. The cup 40 is carried by the inner end of a nipple 41 which projects in fluid-tight relationship through a suitable opening in the wall of the tank 22. The outer end of the nipple 41 connects with a downwardly slanted tube 42 having a down-turned outer or distal end 43 on the lower end of which a hot water spray head 44 is fastened in known manner. The end 43 passes through a spray head panel 28 and secured thereto by a two-part fastener 39 of known type.

Water within the tank 22 is heated in known manner by a heating element 45 that may take the form of a Kelrod element or other known electrically energized heating element.

The top of the basin 21 is covered and enclosed by a cover member 46 which forms the top of the upper portion 7 of the C-shaped body 6. This cover 46 is formed with a downwardly extending flange 47 so as to fit in spaced relationship over the out-turned flange 25-26 at the top of the cold water basin 21 and also the upper edge of the vertical side walls forming the upper leg portion 7. The inter-fitting relationship between the in-turned flange 32 on the vertical sidewalls of the upper leg portion 7, the out-turned flange 25-26 on the cold water basin 21 and the outer margin 48 and down-turned flange 47 on the cover 46 is well-shown in FIG. 5. An important feature of the invention is the provision of adequate venting of the cold water basin 21. This is accomplished by providing a plurality of up-turned U-shaped slot formations 51 (FIG. 8) in the side flanges 25 on the cold water basin 21. The formations 51 are integrally formed from the flanges 25 and serve as spacers for the cover 46 to rest on and provide an elongated vent path between the margin 48 of the cover and the out-turned flange 25-26 on the basin 21. This vent path is indicated by the arrows a-a in FIG. 5. The inter-fitting relationship of the cover margin 48 and flange 47 with the basin flange 25-26 and in-turned housing flange shown in FIGS. 2 and 5 may be readily secured and maintained by four screws, one of which is indicated at 50 in FIG. 5. The four screws 50 pass downwardly through openings in the cover margin 48 through the U-shaped spacer formations 51 and registering openings in the in-turned flange 32.

The cold water, pour-in opening 14, formed in the cover 46 adjacent the front of the brewer 5, is preferably provided with a screen 52 (FIG. 2) so as to prevent foreign objects from entering the enclosed basin 21. Preferably, a cover 49 is provided for the screened opening 14. The upstanding rib around the border of the screen 52 is preferably reduced in height on the front side as indicated at 52a in order to provide an additional vent path at the front of the screen opening.

The cover 46 not only covers the cold water basin 21 but also serves as a floor support for the upper and top heater unit 15. The vertical sidewalls 55-55, and front and rear end walls 56 and 57, of the heater unit 15, are preferably provided with in-turned feet or flanges 58 (FIGS. 2 and 5) whereby these in-turned flanges support the heater unit on the top of the cover 46. The warmer units 16 and 17 are mounted in a top wall of the heater unit 15 in known manner.

Preferably, the rear wall 57 of the heater unit 15 is made so as to be a removable panel, and likewise, the rear wall 60 of the vertical leg portion 9 is preferably made as a removable panel, whereby convenient access may readily be had to the interiors of the heater unit 15 and of the body 6 for such servicing as may be required.

It will be understood that suitable electrical wiring and controls, including a thermostatic control 59 for the heater element 45, will be provided in known manner, the same not forming any part of the present invention. The electrical conductors leading to the top warmers 16 and 17 are arranged to pass through an opening in the cover 46 which registers with an aperture 61 (FIG. 8) in the rear flange 26 on a basin 21. These registering openings are preferably provided with a resilient grommet 62 (FIG. 2) and the conductors for the heaters 16 and 17 can pass through this grommet.

Suitable electrical switches for controlling the water heating element 45 in the tank 22, the bottom warmer 13 and the top warmers 16 and 17 are indicated at 63, 64 and 65 in FIG. 1.

The operation of the brewer 5 will be readily understood since it generally parallels the operation of known cold water, pour-in type beverage brewers. In putting brewer 5 into operation, sufficient cold water is dumped into the basin 21 so as to completely fill the hot water tank 22. The fact that the tank is filled will be known when water commences to siphon out through the side tube 42 and discharge through the spray head 44. When the hot water tank is thus filled, the heating element 45 may be energized and, thereafter, the warmers 13, 16 and 17 likewise energized as needed. Once the cold water contents of the tank 22 have had an opportunity to come to the desired elevated temperature, a filter with the proper amount of ground coffee may be placed in the brewer funnel 10 and inserted into place on the underside of the top leg portion 7 so as to be supported beneath the spray head 44 on the in-turned rails 11-11 mounted on the underside of the leg portion 7.

Assuming that a two-quart batch of coffee is to be brewed, a pitcher containing two quarts of cold water is rapidly dumped into the basin 21 through the opening 14. The cold water will immediately start to flow downwardly through the drain opening 37 and cold water tube 38 at a fast enough rate so that the basin 21 will not overflow even with fast dumping of the two quarts of cold water through the opening 14. The entrance of the cold water into the bottom of the hot water tank 22 is at such a rate that it does not mix to a substantial extent with the hot water therein, but rather, the incoming cold water displaces the hot water upwardly so that it commences to flow out through the side tube 42. Once this flow has started, it will continue due to the siphoning action until the water level in the tank 22 drops below and exposes the bottom of the inverted siphon cup 40. As is well-known, hot water sprays from the spray head 44 onto the ground coffee in the brewing funnel 10 and the coffee beverage forms in the funnel and discharges through the bottom opening of the funnel 10 into the carafe or beaker 12 setting on the warmer plate 13.

It will be seen that up to three batches or carafes of coffee may be prepared and maintained at one time on the brewer 5 by using the three warmers 13, 16 and 17.

It will also be seen that the interior of the hot water tank 22 can be readily reached for cleaning by simply removing the cover 46 and lifting the cover together with the heater unit 15 from the upper leg portion 7. Since periodic cleaning or servicing of the interior of the heater tank is normally required, this ready access is a highly desirable feature.

The inverted L-shaped configuration of the combination cold water basin 21 and deep hot water tank 22 allows the brewer 5 to have a relatively narrow profile from left to right so that it takes up only a small space from one side to the other on a counter top or table. Generally, counter space is at a premium and often limited or restricted. Accordingly, this narrow configuration is highly desirable.

Figure 10:
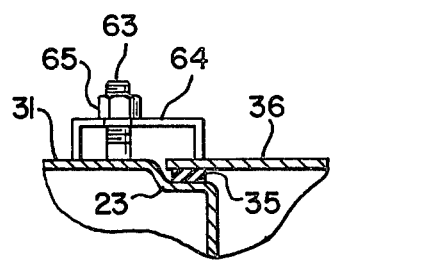
FIG. 10 is an enlarged fragmentary detail sectional view taken on line 10—10 of FIG. 9.

In FIGS. 9 and 10, an alternate means for clamping the hot water tank lid 36 is shown which may be used in place of, or in conjunction with, spaced hold-down legs 53 (FIG. 5). This alternate means comprises three upstanding studs 63-63 welded to the floor 31 of the cold water basin around the depression 23 therein. Inverted U-shaped clamp members 64 fit loosely over the threaded ends of the studs 63 and nuts 65-65 are provided for tightening down the clamps 64 on the top of the disc 36 thereby compressing the ring gasket 35 to the desired degree. It will be seen that by loosening the nuts 65, the clamps 64 may be rotated or removed so that the lid 36 may be lifted and removed.

The invention, as disclosed and incorporated in the cold water, pour-in brewer 5, may be incorporated in the dual-type (automatic/pour-in) brewers such as disclosed in the above-mentioned U.S. patent application Ser. No. 462,139.

What is claimed is:

1. In a cold water, pour-in beverage brewer, including: a generally C-shaped body providing upper and lower horizontal leg portions interconnected from the underside and topside, respectively, by an upright leg portion; means for supporting a removable brewer funnel underneath the upper leg portion; heater means on the lower leg portion for heating and supporting a beaker under said brewer funnel; an elongated shallow cold water basin housed within said upper leg portion; and a deep hot water tank depending from said basin and housed mainly within said upright leg portion; the improvements wherein said cold water basin and said hot water tank constitute an integral inverted L-shaped receptacle, the bottom of said cold water basin having an opening therein that mates with the top opening of said hot water tank, a plate closing off said mating openings, said plate having a drain opening therein, a cold water tube depending from the underside of said plate with the upper end thereof in alignment with said drain opening; said upper leg portion has a top opening and includes a removable cover therefor which also covers said basin, means on the top edge of said cold water basin for removably supporting said basin within said top opening, spacer means for supporting said removable cover above said cold water basin in spaced ralationship therewith, and an upstanding vent tube mounted on said plate having a relatively small bore which provides venting communication between the headspace of said deep hot water tank and said cold water basin, and said drain opening in said plate being substantially smaller than the interior of said cold water tube.

2. In a cold water, pour-in beverage brewer, including: a generally C-shaped body providing upper and lower horizontal leg portions interconnected from the underside and topside, respectively, by an upright leg portion; means for supporting a removable brewer funnel underneath the upper leg portion; heater means on the lower leg portion for heating and supporting a beaker under said brewer funnel; an elongated shallow cold water basin housed within said upper leg portion; and, a deep hot water tank depending from adjacent one end of said basin and housed mainly within said upright leg portion;

said cold water basin and said hot water tank together constituting an integral inverted L-shaped receptacle, the bottom of said cold water basin having an opening that mates with the opening at the top of said hot water tank, a plate closing off said mating openings, said plate having a drain opening therein, a cold water tube depending from the underside of said plate with the upper end thereof in alignment with said drain opening, said drain opening being substantially smaller than the interior of said cold water tube, a vent tube mounted on said plate providing venting communication between the headspace of said hot water tank and the upper portion of said cold water basin; said upper leg portion including a removable cover over a top opening therein; a horizontal flange on at least a portion of the top edge of said top opening; said cold water basin including an out-turned horizontal flange on at least a portion of its top edge which rests flatwise on said first-mentioned horizontal flange on said upper leg portion; said cover having a cold water, pour-in opening and resting on said second-mentioned flange and covering said basin; and, at least one of said cover and said cold water basin having spacer means therebetween providing an elongated vent path between said cover and said basin.

3. In the beverage brewer called for in claim 2, said spacer means being in the form of a plurality of upward projections integrally formed on said out-turned horizontal flange on said cold water basin.

4. In the beverage brewer called for in claim 2, said first-mentioned horizontal flange being in-turned and at least substantially continuous with a first set of fastener-receiving openings therein, said second-mentioned out-turned flange on said cold water basin having a second set of fastener-receiving openings therein in registration with said first set, the margin of said removable cover overlying said second-mentioned out-turned flange on said cold water basin and having a third set of fastener-receiving openings therein in registration with said first and second sets, and fasteners extending through said registering fastener-receiving openings in said first, second and third sets thereof, said spacer means being provided by up-turned integral portions of said second-mentioned out-turned flange on said cold water basin embracing at least a plurality of said second set of fastener-receiving openings, said elongated vent path between said cover and said basin being substantially continuous.

5. In the beverage brewer called for in claim 4, said specer means being generally U-shaped.

6. In the beverage brewer called for in claim 2, said pour-in opening being provided with an upstanding rib and interfitting cover, said rib being of reduced height for a portion of its length so as to provide a vent path for said cold water basin.

* * * * *